(12) United States Patent
Emoto et al.

(10) Patent No.: US 11,906,186 B2
(45) Date of Patent: Feb. 20, 2024

(54) ENVIRONMENTAL EQUIPMENT CONTROL APPARATUS

(71) Applicant: Daikin Industries, LTD., Osaka (JP)

(72) Inventors: Shiori Emoto, Osaka (JP); Atsushi Nishino, Osaka (JP); Satoshi Hashimoto, Osaka (JP); Shouta Hori, Osaka (JP); Junya Nakase, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 549 days.

(21) Appl. No.: 16/621,345

(22) PCT Filed: Jul. 24, 2018

(86) PCT No.: PCT/JP2018/027667
§ 371 (c)(1),
(2) Date: Dec. 11, 2019

(87) PCT Pub. No.: WO2019/022066
PCT Pub. Date: Jan. 31, 2019

(65) Prior Publication Data
US 2020/0208867 A1     Jul. 2, 2020

(30) Foreign Application Priority Data

Jul. 26, 2017 (JP) ................................. 2017-144974

(51) Int. Cl.
*F24F 11/65* (2018.01)
*F24F 11/70* (2018.01)
(Continued)

(52) U.S. Cl.
CPC ............. *F24F 11/65* (2018.01); *F24F 11/70* (2018.01); *G05B 13/027* (2013.01); *G06F 3/015* (2013.01);
(Continued)

(58) Field of Classification Search
CPC ............................. G06N 3/08; F24F 2120/00
(Continued)

(56) References Cited

U.S. PATENT DOCUMENTS

| 8,140,191 B2 | 3/2012 | Kanai et al. |
| 9,020,647 B2 * | 4/2015 | Johnson ................. F24F 11/62 700/277 |

(Continued)

FOREIGN PATENT DOCUMENTS

| JP | 2005-127690 A | 5/2005 |
| JP | 2011-101746 A | 5/2011 |

OTHER PUBLICATIONS

European Search Report of corresponding EP Application No. 18 838 981.1 dated Mar. 9, 2021.
(Continued)

*Primary Examiner* — Md Azad
(74) *Attorney, Agent, or Firm* — Global IP Counselors, LLP (57) ABSTRACT

An environmental equipment control apparatus for controlling a plurality of types of environmental equipment includes a grasping unit that grasps current physical and mental state information of the user, environmental situation information, and target relationship information representing a relationship between a target physical and mental state and a current physical and mental state; learning control plan output means that outputs a control change plan for each of combinations of the plurality of types of environmental equipment in accordance with the current physical and mental state information, the environmental situation information, and the target relationship information; and a selection control unit that selects one control plan from among a plurality of control plans output by the learning control plan output means and executes the one control change plan. The
(Continued)

learning control plan output means learns to update a method for specifying the control plan to be output.

6 Claims, 6 Drawing Sheets

(51) Int. Cl.
    *G05B 13/02*     (2006.01)
    *G06F 3/01*     (2006.01)
    *G06N 3/08*     (2023.01)
    *F24F 120/00*     (2018.01)

(52) U.S. Cl.
    CPC ............... *G06F 3/017* (2013.01); *G06N 3/08* (2013.01); *F24F 2120/00* (2018.01); *G06F 2203/011* (2013.01)

(58) Field of Classification Search
    USPC ......................................................... 700/299
    See application file for complete search history.

(56) References Cited

U.S. PATENT DOCUMENTS

| | | | |
|---|---|---|---|
| 9,298,985 B2* | 3/2016 | Krueger | G02B 27/017 |
| 9,958,861 B2* | 5/2018 | Kinoshita | G05B 19/41865 |
| 2015/0268641 A1* | 9/2015 | Balakrishnan | G05D 23/1917 |
| | | | 700/276 |
| 2016/0228640 A1 | 8/2016 | Pindado et al. | |
| 2018/0136616 A1* | 5/2018 | Takami | G06N 5/022 |

OTHER PUBLICATIONS

International Preliminary Report of corresponding PCT Application No. PCT/JP2018/027667 dated Feb. 6, 2020.
International Search Report of corresponding PCT Application No. PCT/JP2018/027667 dated Oct. 23, 2018.

* cited by examiner

| | AIR CONDITIONING APPARATUS | VENTILATING APPARATUS | AROMA DIFFUSER |
|---|---|---|---|
| CONTROL PLAN A | SET TEMPERATURE -2 | OFF | OFF |
| CONTROL PLAN B | SET TEMPERATURE -1 | ON | OFF |
| CONTROL PLAN C | SET TEMPERATURE ±0 | ON | ON (FOR INCREASING THE DEGREE OF AROUSAL) |
| ... | ... | ... | ... |

FIG. 3

| | AIR CONDITIONING APPARATUS | VENTILATING APPARATUS | AROMA DIFFUSER |
|---|---|---|---|
| CONTROL PLAN P | SET TEMPERATURE +2 | OFF | OFF |
| CONTROL PLAN Q | SET TEMPERATURE +3 | ON | OFF |
| CONTROL PLAN R | SET TEMPERATURE +2 | ON | ON (FOR DECREASING THE DEGREE OF AROUSAL) |
| ... | ... | ... | ... |

ENVIRONMENTAL EQUIPMENT CONTROL APPARATUS

TECHNICAL FIELD

The present invention relates to an environmental equipment control apparatus.

BACKGROUND ART

Hitherto, there has been a demand for provision of an environment capable of enhancing working efficiency of a worker by using environmental equipment, such as an air conditioning apparatus and lighting equipment.

For example, in a working environment control system described in PTL 1 (Japanese Unexamined Patent Application Publication No. 2011-101746), suggestions are made for determining a target physical and mental state on the basis of a correlation between a physical and mental state of a worker and a environment state, and controlling a lighting apparatus and an air conditioning apparatus to create a preferable working environment on the basis of the correlation between the physical and mental state and the environment state to achieve the determined target physical and mental state, thereby achieving a target illuminance, temperature, and humidity.

SUMMARY OF THE INVENTION

Technical Problem

The above system according to the related art is based on the assumption that the illuminance, temperature, and humidity are uniquely specified with respect to the degree of arousal of a user, and achieves an illuminance, temperature, and humidity as an environmental target corresponding to a target electrocardiogram HF by controlling the lighting apparatus and the air conditioning apparatus, thereby enhancing working efficiency of the user.

Actually, however, the degree of arousal of the user is complex, is not uniquely determined from the illuminance, temperature, and humidity, and is changed by various factors, such as a mutual relationship among the illuminance, temperature, and humidity or seasons.

However, when an attempt is made to control environmental equipment to optimize the physical and mental state of the user regarding a complex index influenced by various factors, such as the physical and mental state of the user, it is actually necessary to perform very complex simulation, such as examining an influence on the physical and mental state of the user when each factor is changed. In particular, it is necessary to consider an offset effect or combined effect of a plurality of factors having an influence on the physical and mental state of the user, which makes the amount of information processing very enormous. That is, in the case of changing the control of a plurality of pieces of environmental equipment, it is considered that the physical and mental state of the user is changed by changing the control of each piece of environmental equipment. However, to specify the control state of the lighting apparatus and the air conditioning apparatus for achieving an optimum physical and mental state, it is necessary to consider an offset effect or combined effect of an influence of adjustment of illuminance by the lighting apparatus on the physical and mental state of the worker and an influence of adjustment of temperature or humidity by the air conditioning apparatus on the physical and mental state of the worker, which makes a computation load very enormous.

In addition, a model of simulation incorporating all the factors having an influence on the physical and mental state of the user has not been examined so far, and it is difficult to attempt the above-described simulation.

Thus, it has been impractical to and substantially impossible to control the plurality of pieces of environmental equipment to cause the physical and mental state of the user to approach the target state by using existing techniques.

The present invention has been made in view of the above-described points and an object of the present invention is to provide an environmental equipment control apparatus capable of immediately executing control for improving the physical and mental state of a user.

Solution to Problem

An environmental equipment control apparatus according to a first aspect is an environmental equipment control apparatus for controlling a plurality of types of environmental equipment, and includes a grasping unit, learning control plan output means, and a selection control unit. The grasping unit grasps current physical and mental state information about a current physical and mental state of a user, environmental situation information, and target relationship information representing a relationship between a target physical and mental state and the current physical and mental state. The learning control plan output means outputs a control change plan for each of combinations of the plurality of types of environmental equipment in accordance with the current physical and mental state information, the environmental situation information, and the target relationship information. The selection control unit selects, based on a predetermined condition, one control change plan from among a plurality of the control change plans output by the learning control plan output means after excluding a control change plan satisfying a predetermined exclusion condition, and executes the one control change plan. The learning control plan output means learns to update a method for specifying the control change plan to be output, by using a physical and mental state of the user changed by executing the control change plan selected by the selection control unit.

The information about the physical and mental state of the user is not limited, and various types of information may be used, for example, the degree of arousal, an autonomic nerve balance such as LF/HF, the degree of sleepiness, the degree of tension, the degree of sweating, a body temperature, a temperature on a body surface, voice, and the like.

The predetermined exclusion condition is not limited as long as the exclusion condition is determined at the time of performing an exclusion process by the selection control unit. The exclusion condition may be predetermined as being changed in accordance with a season or period, for example. In addition, the exclusion condition may be determined such that, for example, in a case where the physical and mental state or productivity of the user is changed by executing a control change plan selected by the selection control unit and the change is not a predetermined intended change (the change does not satisfy a predetermined change condition), the control change plan is added to control change plans satisfying the exclusion condition thereafter (the control change plan is excluded from the plurality of control change plans thereafter). In addition, the environmental equipment control apparatus may be configured to enable the user to input and set an exclusion condition.

In the case of controlling a plurality of pieces of environmental equipment, this environmental equipment control apparatus outputs a plurality of control change plans without reflecting each time an offset effect or combined effect of an influence of the control of each piece of environmental equipment on the physical and mental state of the user, and selects one control change plan from among the plurality of control change plans on the basis of a predetermined condition, thereby being capable of determining the details of control promptly. With use of a change in the physical and mental state of the user in the case of executing the details of control of the selected control change plan, the learning control plan output means leans to update a method for specifying control change plans to be output, and thus a highly efficient control change plan that causes the physical and mental state of the user to approach a target state can be output and executed through the learning.

In addition, in this environmental equipment control apparatus, an exclusion condition is predetermined to exclude a control change plan not desired by the user. Accordingly, even if the control change plan not desired by the user is included in a plurality of control change plans output by the learning control plan output means, it is possible to prevent the control change plan from being executed.

An environmental equipment control apparatus according to a second aspect is the environmental equipment control apparatus according to the first aspect, in which the physical and mental state of the user is a degree of arousal of the user.

Here, the degree of arousal is not limited, but may be, for example, determined on the basis of the state of heartbeats of the user, the temperature of a skin of the user, the number of times of breathing per unit time of the user, the brain waves of the user, or a combination thereof.

This environmental equipment control apparatus is capable of causing the degree of arousal of the user to approach a target state of the degree of arousal.

An environmental equipment control apparatus according to a third aspect is the environmental equipment control apparatus according to the first or second aspect, in which the learning control plan output means is computing means using a neural network.

This environmental equipment control apparatus is capable of outputting a plurality of types of control change plans by using a neural network.

An environmental equipment control apparatus according to a fourth aspect is the environmental equipment control apparatus according to any one of the first to third aspects, in which the selection control unit selects the one control change plan from among the plurality of control change plans output by the learning control plan output means while rotating combination patterns of the plurality of types of environmental equipment.

This environmental equipment control apparatus is capable of providing variations to combination patterns of the plurality of types of environmental equipment that can be caused to learn by selecting and executing a control plan while rotating combination patterns of the plurality of types of environmental equipment, and is capable of increasing learning efficiency.

An environmental equipment control apparatus according to a fifth aspect is the environmental equipment control apparatus according to any one of the first to fourth aspects, in which the plurality of types of environmental equipment include at least any two or more of an apparatus that adjusts a temperature, an apparatus that adjusts a humidity, an apparatus that adjusts a carbon dioxide concentration, and an apparatus that provides aroma.

This environmental equipment control apparatus is capable of causing the physical and mental state of the user to approach a target state by using at least any two or more of the apparatus that adjusts a temperature, the apparatus that adjusts a humidity, the apparatus that adjusts a carbon dioxide concentration, and the apparatus that provides aroma.

An environmental equipment control apparatus according to a sixth aspect is the environmental equipment control apparatus according to any one of the first to fifth aspects, in which the learning control plan output means has and is capable of outputting an initial control change plan, before the learning is performed, for each of the combinations of the plurality of types of environmental equipment corresponding to initial current physical and mental state information, initial environmental situation information, and initial target relationship information.

This environmental equipment control apparatus is capable of promptly outputting a plurality of types of control change plans because the learning control plan output means has an initial control change plan, before the learning is performed, for each of the combinations of the plurality of types of environmental equipment corresponding to initial current physical and mental state information, initial environmental situation information, and initial target relationship information, even in a stage before the learning control plan output means performs learning.

Advantageous Effects of Invention

The environmental equipment control apparatus according to the first aspect is capable of outputting and executing a highly efficient control change plan that causes the physical and mental state of a user to approach a target state through learning while promptly determining the details of control, and is capable of preventing a control change plan that is not desired by the user from being executed even if the control change plan is included in a plurality of control change plans output by the learning control plan output means.

The environmental equipment control apparatus according to the second aspect is capable of causing the degree of arousal of the user to approach a target state of the degree of arousal.

The environmental equipment control apparatus according to the third aspect is capable of outputting a plurality of types of control change plans by using a neural network.

The environmental equipment control apparatus according to the fourth aspect is capable of providing variations to combination patterns of a plurality of types of environmental equipment that can be caused to learn, and is capable of increasing learning efficiency.

The environmental equipment control apparatus according to the fifth aspect is capable of causing the physical and mental state of the user to approach a target state by using at least any two or more of an apparatus that adjusts a temperature, an apparatus that adjusts a humidity, an apparatus that adjusts a carbon dioxide concentration, and an apparatus that provides aroma.

The environmental equipment control apparatus according to the sixth aspect is capable of promptly outputting a plurality of types of control change plans even in a stage before the learning control plan output means performs learning.

DESCRIPTION OF EMBODIMENTS

Hereinafter, a description will be given of an environmental equipment control system adopting an environmental equipment control apparatus by taking one embodiment as an example, but the present invention is not limited thereto.

Figure 1:
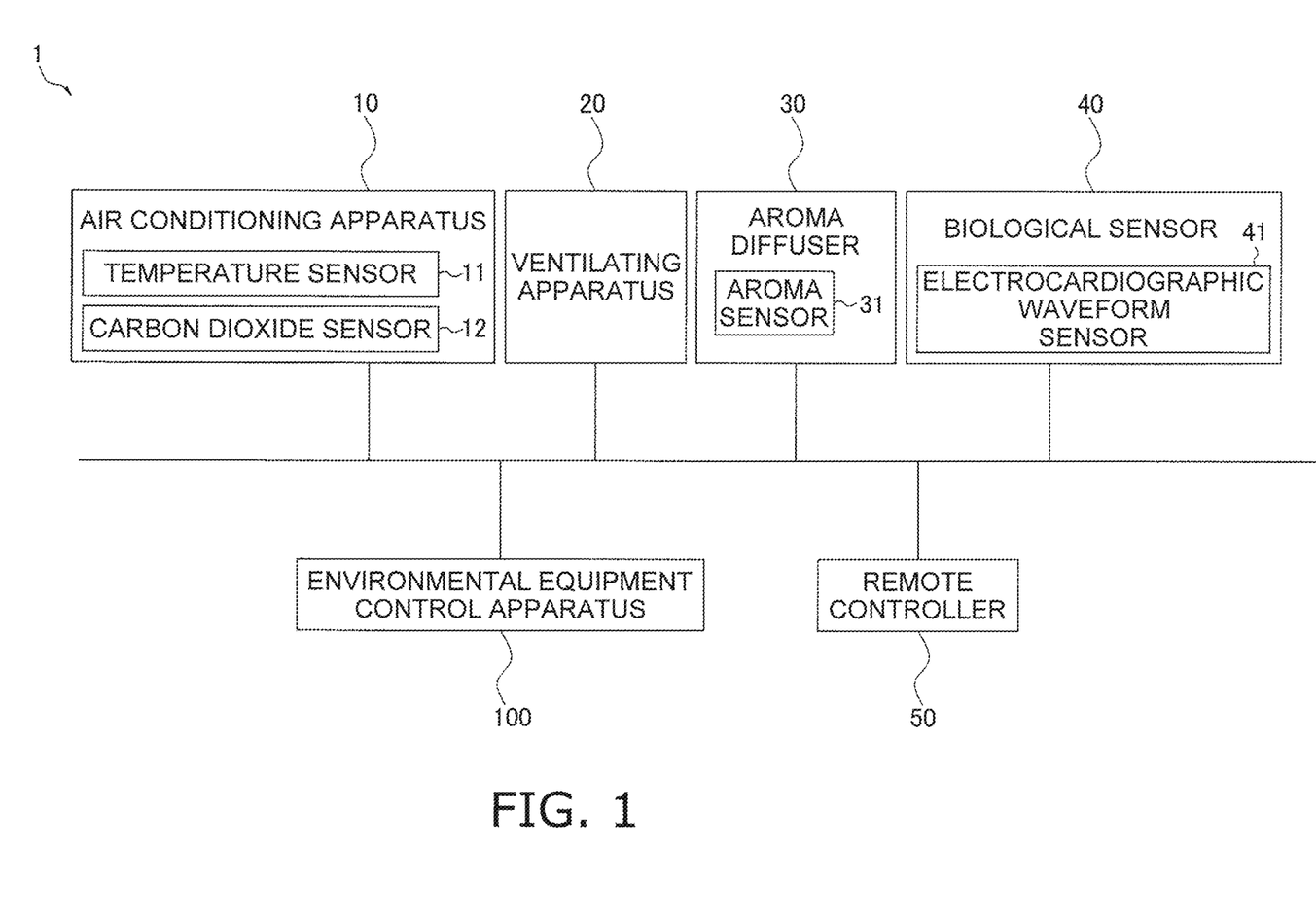
FIG. 1 is a schematic configuration diagram of an entire environmental equipment control system.

(1) Schematic Configuration of Entire Environmental Equipment Control System FIG. 1 is a schematic configuration diagram of an entire environmental equipment control system 1.

The environmental equipment control system 1 is a system for causing the degree of arousal of a user, which is the physical and mental state of the user, to approach a target degree of arousal by using a plurality of types of environmental equipment.

The environmental equipment control system 1 mainly includes an air conditioning apparatus 10, a ventilating apparatus 20, an aroma diffuser 30, a biological sensor 40, a remote controller 50, and an environmental equipment control apparatus 100. These apparatuses are connected to each other in a wired or wireless manner so as to be capable of communicating with each other.

The air conditioning apparatus 10, the ventilating apparatus 20, and the aroma diffuser 30 are pieces of environmental equipment of different types and are pieces of equipment capable of controlling the degree of arousal of the user.

The air conditioning apparatus 10 is an apparatus capable of adjusting a temperature in a room where the user is present, and includes a refrigerant circuit capable of implementing a refrigeration cycle using a compressor, a condenser, an expansion valve, and an evaporator connected to each other, with a connection between an outdoor unit and an indoor unit, which are not illustrated. The air conditioning apparatus 10 includes a temperature sensor 11 that detects an air temperature in the room and a carbon dioxide sensor 12 that detects a carbon dioxide concentration in the room.

The ventilating apparatus 20 is an apparatus capable of ventilating the room where the user is present, and is capable of adjusting a carbon dioxide concentration in the room by ventilating the room using ON/OFF control. The ventilating apparatus 20 includes a fan, a ventilation duct, and the like.

The aroma diffuser 30 is an apparatus capable of supplying a predetermined aromatic substance into the room where the user is present, and is capable of adjusting an aromatic concentration in the room using ON/OFF control. The type of aromatic substance is not limited, but may preferably be an aroma having an influence on the degree of arousal of the user. The aroma diffuser 30 includes an aroma sensor 31 that detects an aroma concentration in the room.

The biological sensor 40 is a sensor for grasping the degree of arousal of the user, and includes an electrocardiographic waveform sensor 41 that detects an electrocardiographic waveform of the user in this embodiment. The electrocardiographic waveform sensor 41 is used by being attached near the heart of the user, and is capable of wirelessly transmitting detected electrocardiographic waveform data to a nearby apparatus, such as the environmental equipment control apparatus 100.

The remote controller 50 receives from the user various types of input data to be used in the environmental equipment control system 1. The remote controller 50 is configured to be capable of operating the air conditioning apparatus 10, the ventilating apparatus 20, and the aroma diffuser 30. In addition, the remote controller 50 receives information about a target degree of arousal from the user. Specifically, the remote controller 50 receives input of information about the degree of complexity of work to be performed by the user. The degree of complexity of work may be divided in advance, for example, in a plurality of stages, and may be selected by the user. In general, a human is capable of increasing working efficiency as the degree of arousal increases in the case of performing simple work, but working efficiency may decrease when the degree of arousal is too high in the case of performing complex work (Yerkes-Dodson law). That is, there is an optimum degree of arousal for performing complex work.

As will be described below, the environmental equipment control apparatus 100 is an apparatus that controls various types of environmental equipment such that the degree of arousal of the user can approach a target degree of arousal that is grasped through receipt of input from the user by the remote controller 50.

(2) Configuration of Environmental Equipment Control Apparatus 100

Figure 2:
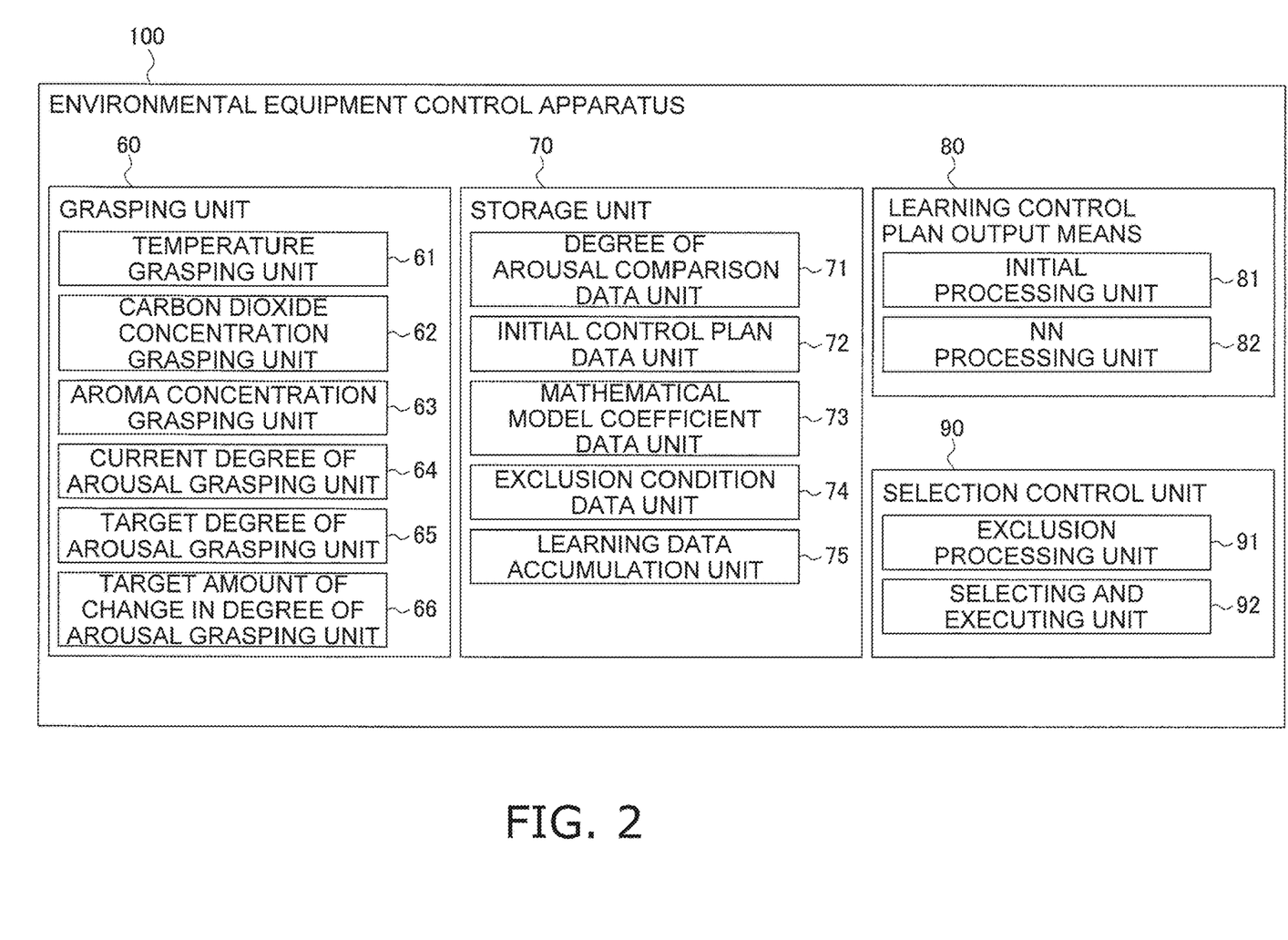
FIG. 2 is a block configuration diagram of an environmental equipment control apparatus.

FIG. 2 is a functional block configuration diagram of the environmental equipment control apparatus 100.

The environmental equipment control apparatus 100 includes a grasping unit 60 for grasping various types of information, a storage unit 70 for storing various types of data, learning control plan output means 80 that determines a control plan to be executed by the individual pieces of environmental equipment, and a selection control unit 90 that controls the individual pieces of environmental equipment. The environmental equipment control apparatus 100 is capable of obtaining information from the biological sensor 40 and the remote controller 50 and controlling the air conditioning apparatus 10, the ventilating apparatus 20, and the aroma diffuser 30, and is constituted by one or a plurality of CPUs, ROMs, and RAMs.

(2-1) Grasping Unit 60

The grasping unit 60 includes a temperature grasping unit 61, a carbon dioxide concentration grasping unit 62, an aroma concentration grasping unit 63, a current degree of arousal grasping unit 64, a target degree of arousal grasping unit 65, a target amount of change in degree of arousal grasping unit 66, and the like, and is constituted by one or a plurality of CPUs, RAMs, and the like.

The temperature grasping unit 61 obtains, through communication, a value detected by the temperature sensor 11 of the air conditioning apparatus 10 and grasps the value as a temperature in the room where the user is present.

The carbon dioxide concentration grasping unit 62 obtains, through communication, a value detected by the carbon dioxide sensor 12 of the air conditioning apparatus 10 and grasps the value as a carbon dioxide concentration in the room where the user is present.

The aroma concentration grasping unit 63 obtains, through communication, a value detected by the aroma sensor 31 of the aroma diffuser 30 and grasps the value as an aroma concentration in the room where the user is present.

The current degree of arousal grasping unit 64 refers to a degree of arousal comparison data unit 71 stored in the storage unit 70, which will be described below, on the basis of information detected by the electrocardiographic waveform sensor 41 as the biological sensor 40, thereby grasping a current degree of arousal of the user.

The target degree of arousal grasping unit 65 grasps a target degree of arousal in accordance with the degree of complexity of work received by the remote controller 50. Specifically, the target degree of arousal grasping unit 65 grasps a target degree of arousal such that the target degree of arousal increases as the degree of complexity of work decreases in accordance with a predetermined relationship in a case where the degree of complexity of work is lower than a predetermined standard degree of complexity, and that a predetermined degree of arousal enabling higher working efficiency conforming to the Yerkes-Dodson law can be achieved in a case where the degree of complexity of work is higher than or equal to the predetermined standard degree of complexity.

The target amount of change in degree of arousal grasping unit 66 grasps a target amount of change in degree of arousal ($\Delta A$), which is a difference between the current degree of arousal grasped by the current degree of arousal grasping unit 64 and the target degree of arousal grasped by the target degree of arousal grasping unit 65.

(2-2) Storage Unit 70

The storage unit 70 includes the degree of arousal comparison data unit 71, an initial control plan data unit 72, a mathematical model coefficient data unit 73, an exclusion condition data unit 74, a learning data accumulation unit 75, and the like, and is constituted by one or a plurality of ROMs, RAMs, and the like.

As described above, the degree of arousal comparison data unit 71 stores in advance data for grasping the degree of arousal estimated from the information detected by the electrocardiographic waveform sensor 41 as the biological sensor 40. The relationship between an electrocardiographic waveform and the degree of arousal is determined on the basis of known matters. In addition, for example, the degree of arousal of the user may be grasped by specifying the degree of arousal corresponding to the electrocardiographic waveform grasped from the electrocardiographic waveform sensor 41 with reference to data indicating the relationship between the electrocardiographic waveform and the degree of arousal stored in advance.

The initial control plan data unit 72 is data that is referred to at the time of specifying a control plan by an initial processing unit 81 of the learning control plan output means 80, which will be described below. In accordance with the value of a target amount of change in degree of arousal ($\Delta A$), a plurality of types of initial control plan data, which are combinations of control plans for the individual pieces of environmental equipment, are determined in advance.

Specifically, as initial control plans for achieving the target amounts of change in degree of arousal ($\Delta A$), a plurality of types of average control plans grasped from tests or the like are determined in advance for each target amount of change in degree of arousal ($\Delta A$) and are stored in the initial control plan data unit 72.

Figure 3:
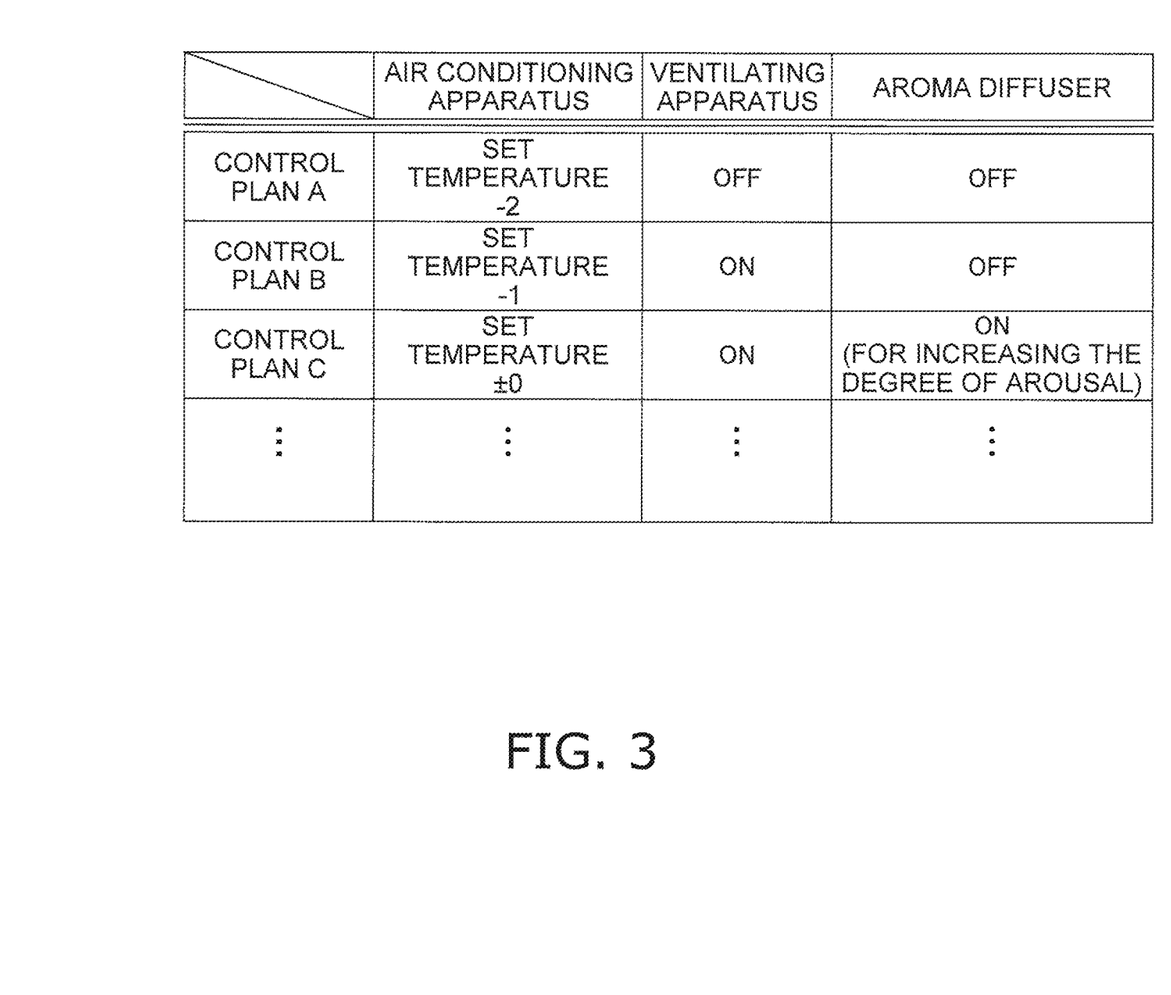
FIG. 3 is a table showing an example of a plurality of types of control plans for increasing the degree of arousal of a user by one degree.

For example, regarding control plans in a case where the target amount of change in degree of arousal ($\Delta A$) is +1, that is, control plans for increasing the degree of arousal by one degree, a plurality of types of combinations of control plans for the air conditioning apparatus 10, the ventilating apparatus 20, and the aroma diffuser 30 are stored as illustrated in FIG. 3. Here, as an example of a control plan for increasing the degree of arousal by one degree (control plan A), there is a plan of decreasing the set temperature of the air conditioning apparatus 10 by two degrees and turning OFF the ventilating apparatus 20 and the aroma diffuser 30. Also, as another example of a control plan for increasing the degree of arousal by one degree (control plan B), there is a plan of decreasing the set temperature of the air conditioning apparatus 10 by one degree, turning ON the ventilating apparatus 20, and turning OFF the aroma diffuser 30. Furthermore, as another example of a control plan for increasing the degree of arousal by one degree (control plan C), there is a plan of not changing the set temperature of the air conditioning apparatus 10, turning ON the ventilating apparatus 20, and turning ON the aroma diffuser 30 by using aroma of a type for increasing the degree of arousal.

Figure 4:
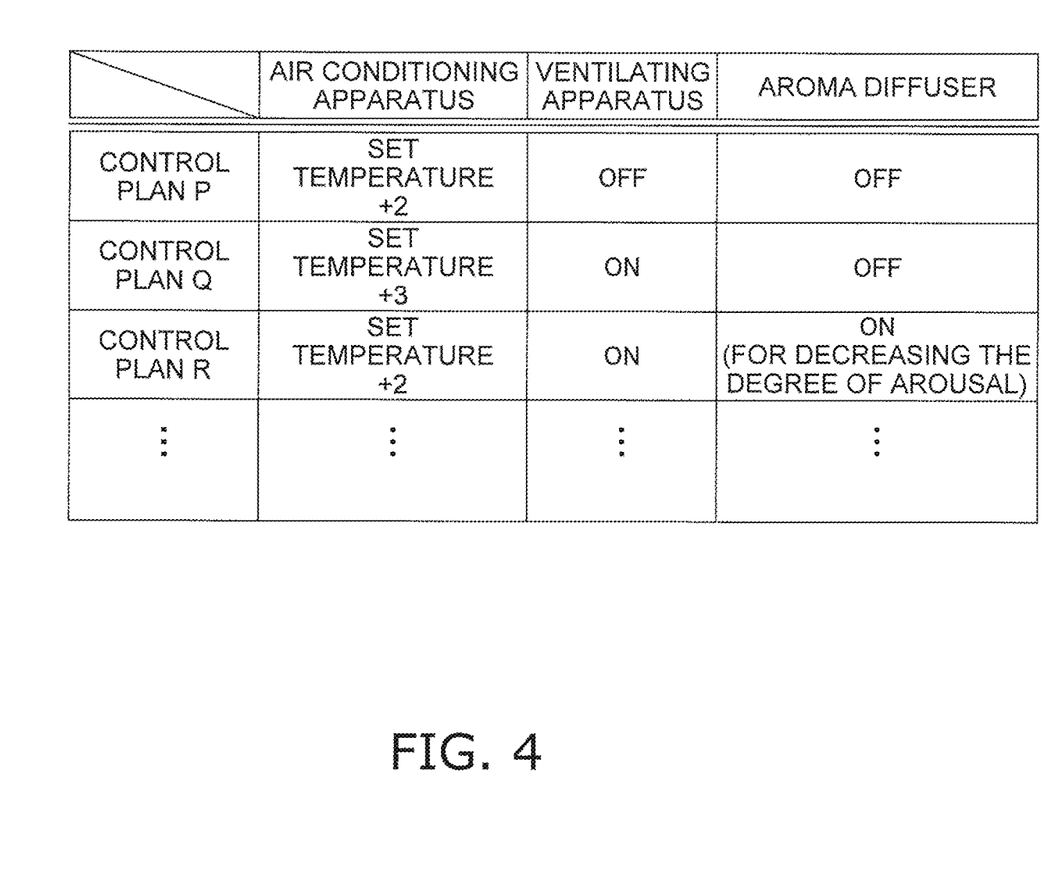
FIG. 4 is a table showing an example of a plurality of types of control plans for decreasing the degree of arousal of a user by one degree.

In addition, for example, regarding control plans in a case where the target amount of change in degree of arousal ($\Delta A$) is −1, that is, control plans for decreasing the degree of arousal by one degree, a plurality of types of combinations of control plans for the air conditioning apparatus 10, the ventilating apparatus 20, and the aroma diffuser 30 are stored as illustrated in FIG. 4. Here, as an example of a control plan for decreasing the degree of arousal by two degrees (control plan P), there is a plan of increasing the set temperature of the air conditioning apparatus 10 by one degree and turning OFF the ventilating apparatus 20 and the aroma diffuser 30. Also, as another example of a control plan for decreasing the degree of arousal by one degree (control plan Q), there is a plan of increasing the set temperature of the air conditioning apparatus 10 by three degrees, turning ON the ventilating apparatus 20, and turning OFF the aroma diffuser 30. Furthermore, as another example of a control plan for decreasing the degree of arousal by one degree (control plan R), there is a plan of increasing the set temperature of the air conditioning apparatus 10 by two degrees, turning ON the ventilating apparatus 20, and turning ON the aroma diffuser 30 by using aroma of a type for decreasing the degree of arousal.

In the above-described manner, the initial control plan data unit 72 stores, for each target amount of change in degree of arousal ($\Delta A$), initial control plans for each combination of a plurality of pieces of environmental equipment.

The mathematical model coefficient data unit 73 stores data of a coefficient of a mathematical model (mathematical model coefficient data) that is referred to at the time of determining a mathematical model to be used to specify a control plan by an NN processing unit 82 of the learning control plan output means 80, which will be described below. The mathematical model coefficient data is updated and overwritten every time learning for reflecting a control plan execution result is performed by the NN processing unit 82 of the learning control plan output means 80, which will be described below.

The exclusion condition data unit 74 is data for excluding a control plan unsuitable for the user in a case where such a control plan is included in a plurality of control plans output by the initial processing unit 81 or the NN processing unit 82 of the learning control plan output means 80, which will be described below, and is predetermined and stored. The exclusion data is, although not limited, for example, data of a control plan not desired by the user, such as a control plan including an increase of five degrees or more from a current set temperature and a control plan including a decrease of three degrees or more from a current set temperature with the aroma diffuser 30 being in an ON state, and is predetermined and stored. An unsuccessful case may be learned and added to the exclusion condition.

The learning data accumulation unit 75 stores a plurality of types of learning data, which is data in which a control plan selected and executed by the selection control unit 90, which will be described below, measured values of individual sensors at the time, and the amount of change in the degree of arousal of the user after a predetermined period of time (for example, 10 minutes) elapses from the start of execution of the control plan, are associated with each other. The learning data is used for learning performed by the NN processing unit 82 of the learning control plan output means 80, which will be described below, and the coefficient of the mathematical model is updated.

(2-3) Learning Control Plan Output Means 80

The learning control plan output means 80 includes the initial processing unit 81, the NN processing unit 82, and the like, and is constituted by one or a plurality of CPUs, RAMs, and the like.

The initial processing unit 81 finds control plan data for achieving the target amount of change in degree of arousal ($\Delta A$) grasped by the target amount of change in degree of arousal grasping unit 66 of the grasping unit 60 from among the information stored in the initial control plan data unit 72 of the storage unit 70, and outputs a plurality of control plans so that one control plan is eventually selected. In the process of outputting the plurality of control plans, the initial processing unit 81 does not perform each time a process of examining and determining an offset effect, combined effect, or acclimatization of an influence of details of control in each piece of environmental equipment on the degree of arousal of the user, but simply performs a process of finding a plurality of control plans from among the information stored in the initial control plan data unit 72 of the storage unit 70.

The NN processing unit 82 is configured to perform a computation process of a plurality of neural networks (NNs) by using, as inputs, a room temperature grasped by the temperature grasping unit 61 of the grasping unit 60, a carbon dioxide concentration grasped by the carbon dioxide concentration grasping unit 62, an aroma concentration grasped by the aroma concentration grasping unit 63, a current degree of arousal grasped by the current degree of arousal grasping unit 64, and a target amount of change in degree of arousal ($\Delta A$) grasped by the target amount of change in degree of arousal grasping unit 66 and by outputting a plurality of types of control plans. A neural network has a mathematical model. The NN processing unit 82 constructs a mathematical model by using a coefficient that is stored in the mathematical model coefficient data unit 73 while being updated as needed, and performs a computation process of the neural network. The NN processing unit 82 performs a computation process of the neural network in this manner, thereby outputting a plurality of types of control plans that enable the degree of arousal of the user to approach the target degree of arousal in accordance with the room temperature, the carbon dioxide concentration, the aroma concentration, the current degree of arousal, and the target amount of change in degree of arousal ($\Delta A$). The plurality of types of control plans output here are used to eventually select one control plan. Also in this process of outputting the plurality of control plans, the NN processing unit 82 performs a process of calculating the plurality of output plans by using input information and the above-described mathematical model without performing each time a process of examining and determining an offset effect, combined effect, or acclimatization of an influence of details of control in each piece of environmental equipment on the degree of arousal of the user.

(2-4) Selection Control Unit 90

The selection control unit 90 includes an exclusion processing unit 91, a selecting and executing unit 92, and the like, and is constituted by one or a plurality of CPUs, RAMs, and the like.

The exclusion processing unit 91 performs a process of finding a control plan satisfying the exclusion condition stored in the exclusion condition data unit 74 from among the plurality of types of control plans output by the initial processing unit 81 or the NN processing unit 82 and excluding the control plan from the target to be selected by the selecting and executing unit 92.

The selecting and executing unit 92 selects one control plan from among a plurality of types of control plans that have been output by the initial processing unit 81 or the NN processing unit 82 and that remain after the exclusion process by the exclusion processing unit 91, and executes the one control plan. Here, the selecting and executing unit 92 selects one control plan from among the plurality of types of control plans in rotation. Although not limited, in this embodiment, the selecting and executing unit 92 selects a control plan in accordance with a predetermined order of combinations of pieces of environmental equipment. As a result of the execution of a control plan by the selecting and executing unit 92, various control operations of the air conditioning apparatus 10, the ventilating apparatus 20, and the aroma diffuser 30 are performed in accordance with the control plan.

(3) Process by Environmental Equipment Control Apparatus 100

Figure 5:
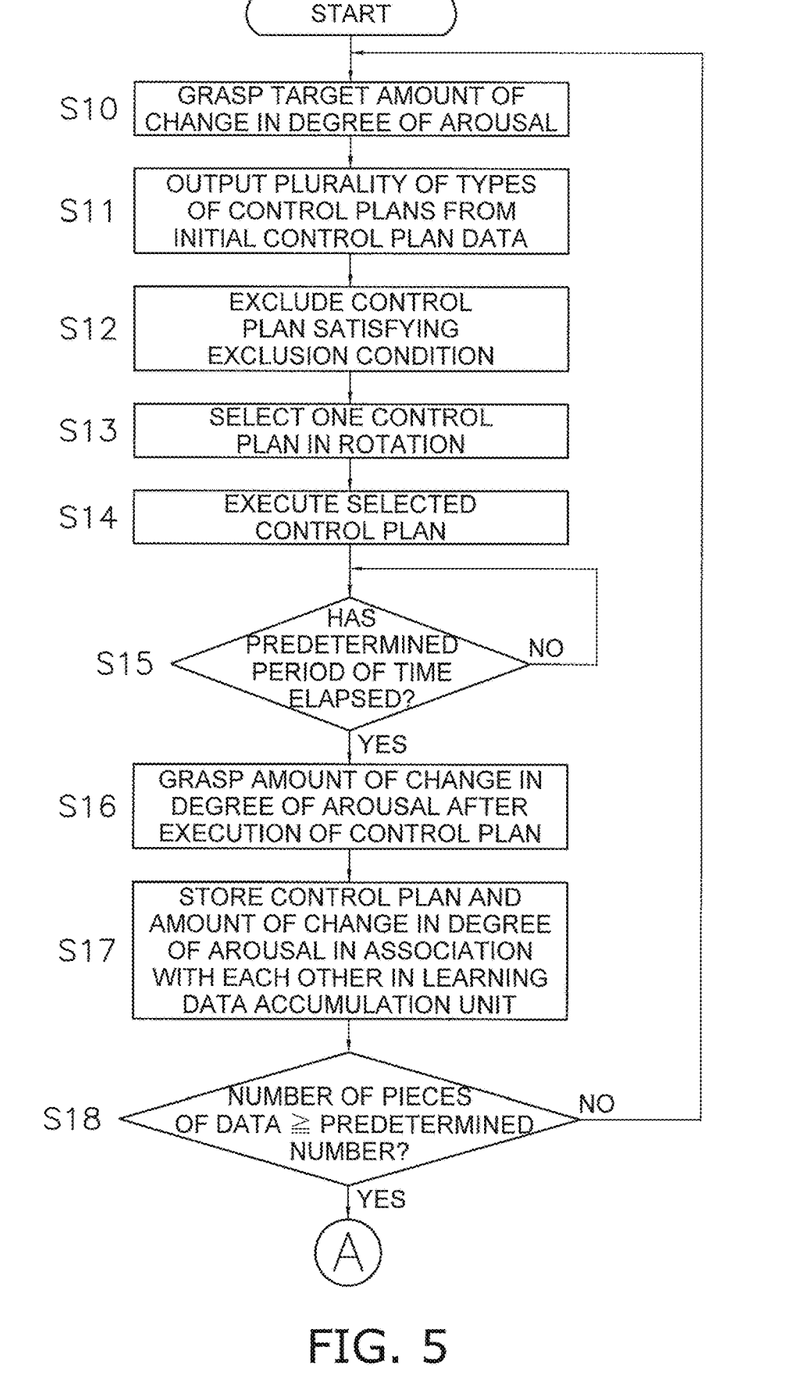
FIG. 5 is a flowchart (part 1) of a process performed by the environmental equipment control apparatus.
Figure 6:
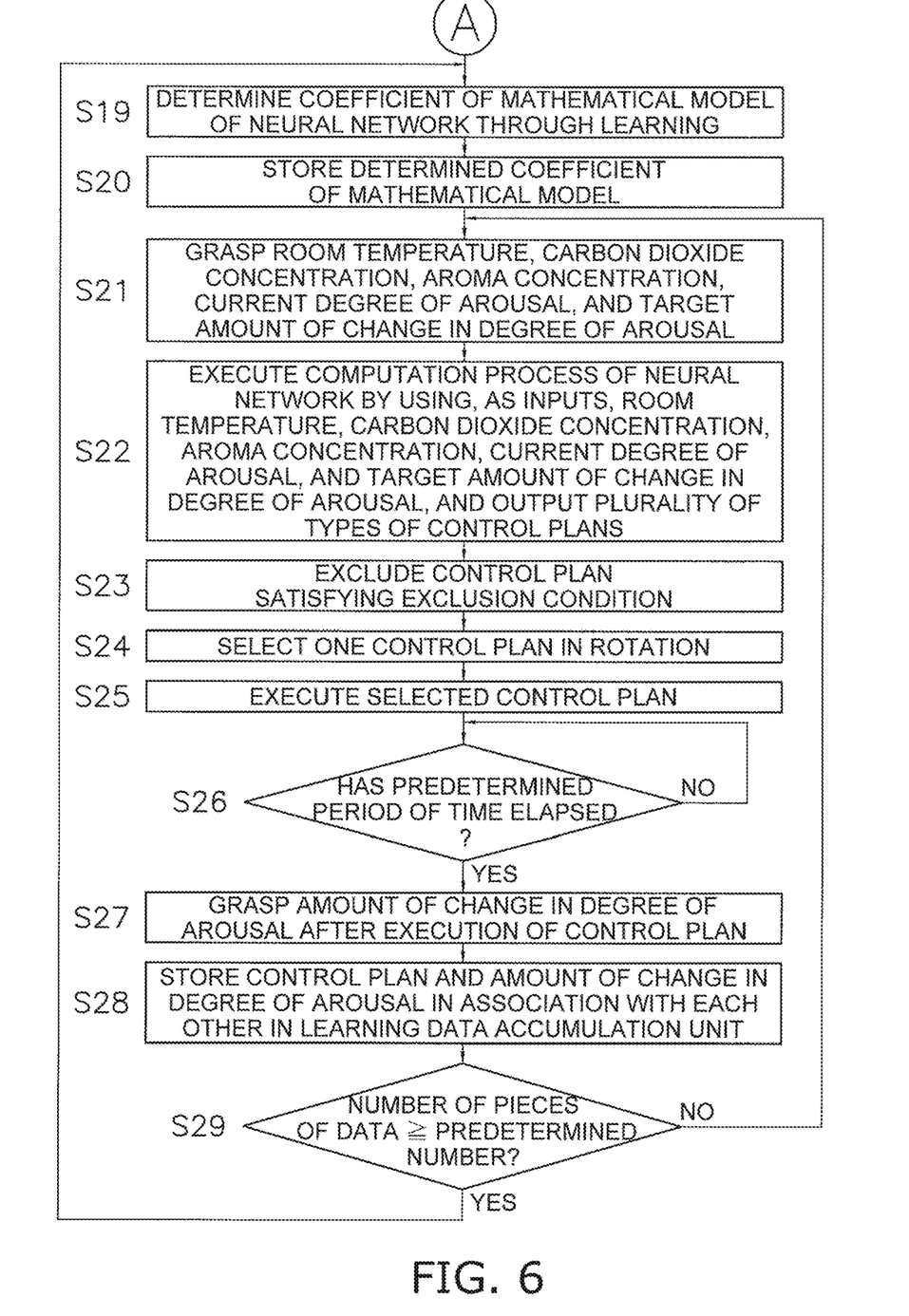
FIG. 6 is a flowchart (part 2) of the process performed by the environmental equipment control apparatus.

FIGS. 5 and 6 illustrate a flowchart of a process performed by the environmental equipment control apparatus 100.

Mainly in the first half of the process, the environmental equipment control apparatus 100 performs a process for obtaining sample data of learning so as to obtain a mathematical model of a neural network capable of outputting a more appropriate control plan. After learning has been performed, a process of continuing further learning while specifying a control plan by using the mathematical model obtained through the learning is performed. Hereinafter, a flow each process will be described.

In step S10, the grasping unit 60 grasps various types of information. Specifically, the grasping unit 60 grasps a target amount of change in degree of arousal ($\Delta A$).

In step S11, the initial processing unit 81 finds control plan data for achieving the target amount of change in degree of arousal ($\Delta A$) grasped in step S10 from among the information stored in the initial control plan data unit 72, and outputs a plurality of types of control plans.

In step S12, the exclusion processing unit 91 finds a control plan satisfying the exclusion condition from among the plurality of types of control plans output by the initial processing unit 81 in step S11, and excludes the control plan.

In step S13, the selecting and executing unit 92 selects one control plan from among a plurality of types of control plans that have been output by the initial processing unit 81 and that remain after the exclusion process by the exclusion processing unit 91. Here, the selecting and executing unit 92 selects one control plan in rotation.

In step S14, the selecting and executing unit 92 executes the control plan selected in step S13 and controls the air conditioning apparatus 10, the ventilating apparatus 20, and the aroma diffuser 30, thereby changing an indoor environment.

In step S15, the selecting and executing unit 92 determines whether or not a predetermined period of time has elapsed from the start of the control plan in step S14. Here, in a case where a determination is made that the predetermined period of time has elapsed, the process proceeds to step S16. In a case where a determination is made that the predetermined period of time has not elapsed, the selecting and executing unit 92 waits until the predetermined period of time elapses.

In step S16, the selecting and executing unit 92 compares the current degree of arousal that is grasped by the current degree of arousal grasping unit 64 before the control plan is executed in step S14 with the current degree of arousal that is grasped by the current degree of arousal grasping unit 64 after the control plan is executed in step S14 for the predetermined period of time, and grasps the amount of change in degree of arousal.

In step S17, the selecting and executing unit 92 stores information on the control plan executed in step S14 and the amount of change in degree of arousal grasped in step S16 in association with each other in the learning data accumulation unit 75.

In step S18, the selecting and executing unit 92 determines whether or not the number of pieces of data stored in the learning data accumulation unit 75 (the number of pairs of information on a control plan and an amount of change in degree of arousal) is larger than or equal to a predetermined number. Here, in a case where a determination is made that the number of pieces of data is larger than or equal to the predetermined number, the process proceeds to step S19 (moves from "A" in FIG. 5 to "A" in FIG. 6). In a case where a determination is made that the number of pieces of data is smaller than the predetermined number, the process returns to step S10 and the process is repeated to further accumulate learning data.

In step S19, because sufficient data is accumulated in the learning data accumulation unit 75, the NN processing unit 82 performs learning by using the data and creates or updates a coefficient of a mathematical model of a neural network. Specifically, as a result of determining the coefficient of the mathematical model of the neural network through the learning, the NN processing unit 82 learns how the degree of arousal of the user is changed by what change in environment under what environment and what degree of arousal of the user.

In step S20, the NN processing unit 82 stores the coefficient of the mathematical model determined in step S19 in the mathematical model coefficient data unit 73 (updates coefficient data).

In step S21, the grasping unit 60 grasps various types of information again. Specifically, the grasping unit 60 grasps a room temperature, a carbon dioxide concentration, an aroma concentration, a current degree of arousal, and a target amount of change in degree of arousal ($\Delta A$).

In step S22, the NN processing unit 82 constructs a mathematical model of a neural network by using the coefficient data stored in the mathematical model coefficient data unit 73. Subsequently, the NN processing unit 82 executes a computation process of the neural network by using, as inputs, the room temperature, the carbon dioxide concentration, the aroma concentration, the current degree of arousal, and the target amount of change in degree of arousal ($\Delta A$), thereby outputting a plurality of types of control plan data for achieving the target amount of change in degree of arousal ($\Delta A$) grasped in step S21.

In step S23, the exclusion processing unit 91 finds a control plan satisfying the exclusion condition from among the plurality of types of control plans output by the NN processing unit 82 in step S22, and excludes the control plan.

In step S24, the selecting and executing unit 92 selects one control plan from among a plurality of types of control plans that have been output by the NN processing unit 82 and that remain after the exclusion process by the exclusion processing unit 91. Here, the selecting and executing unit 92 selects one control plan in rotation.

In step S25, the selecting and executing unit 92 executes the control plan selected in step S24 and controls the air conditioning apparatus 10, the ventilating apparatus 20, and the aroma diffuser 30, thereby changing an indoor environment.

In step S26, the selecting and executing unit 92 determines whether or not a predetermined period of time has elapsed from the start of the control plan in step S25. Here, in a case where a determination is made that the predetermined period of time has elapsed, the process proceeds to step S27. In a case where a determination is made that the predetermined period time has not elapsed, the selecting and executing unit 92 waits until the predetermined period of time elapses. Note that the predetermined period of time used here is similar to the one in step S15.

In step S27, the selecting and executing unit 92 compares the current degree of arousal that is grasped by the current degree of arousal grasping unit 64 before the control plan is executed in step S25 with the current degree of arousal that is grasped by the current degree of arousal grasping unit 64 after the control plan is executed in step S25 for the predetermined period of time, and grasps the amount of change in degree of arousal.

In step S28, the selecting and executing unit 92 stores information on the control plan executed in step S25 and the amount of change in degree of arousal grasped in step S27 in association with each other in the learning data accumulation unit 75.

In step S29, the selecting and executing unit 92 determines whether or not the number of pieces of data stored in the learning data accumulation unit 75 (the number of pairs of information on a control plan and an amount of change in degree of arousal) after the last learning is larger than or equal to a predetermined number. Here, in a case where a determination is made that the number of pieces of data is larger than or equal to the predetermined number, the process returns to step S19 and learning is performed again. In a case where a determination is made that the number of pieces of data is smaller than the predetermined number, the process returns to step S21 and the process is repeated to further accumulate learning data.

(4) Characteristics of Embodiment (4-1)

In the environmental equipment control apparatus 100 according to this embodiment, the initial processing unit 81 is capable of outputting a plurality of control plans corresponding to a target amount of change in degree of arousal (ΔA) only by referring to initial control plan data. In addition, the NN processing unit 82 is capable of outputting a plurality of control plans only by executing a computation process of a neural network having a mathematical model constructed by using mathematical model coefficient data. From among the plurality of control plans output in this way, one control plan is selected and executed in simple rotation by the selecting and executing unit 92, with the control plans not being compared or examined.

Thus, because a computation process for examining and determining an offset effect or combined effect of an influence of control of each piece of environmental equipment on the user (influence on the degree of arousal) is not performed each time while one control plan is selected and executed, it is possible to reduce a computation load, promptly select one control plan, and execute the control plan. Thus, it is possible to control each piece of environmental equipment in real time so as to achieve the degree of arousal desired by the user, and it is possible to achieve the degree of arousal desired by the user early.

The environmental equipment control apparatus 100 performs learning by using a plurality of pieces of learning data constituted by pairs of an executed control plan and a change in the degree of arousal of the user caused by executing the control plan, and updates a coefficient of a mathematical model of a neural network, thereby being capable of constructing a mathematical model reflecting a trend of change in the degree of arousal of the user as a result including an offset effect, combined effect, or acclimatization by controlling the environmental equipment. Accordingly, it is possible to output, through a computation process of a neural network, a control plan accurately reflecting a trend of the degree of arousal of the user as learning is continued.

(4-2)

In the environmental equipment control apparatus 100 according to this embodiment, the exclusion processing unit 91 excludes a control plan not desired by the user from a plurality of types of control plans output by the initial processing unit 81 or the NN processing unit 82. Thus, even if a control plan not desired by the user is included in the plurality of types of control plans output by the initial processing unit 81 or the NN processing unit 82, it is possible to prevent the control plan not desired by the user from being executed.

(4-3)

The environmental equipment control apparatus 100 according to this embodiment is capable of controlling the air conditioning apparatus 10, the ventilating apparatus 20, and the aroma diffuser 30, which are pieces of environmental equipment of different types, by uniformly using the degree of arousal which is the same index. That is, the individual pieces of environmental equipment are controlled by using a uniform index, the degree of arousal, instead of using different indexes for the individual pieces of environmental equipment, for example, a temperature as an index for controlling the air conditioning apparatus 10 and an aroma concentration as an index for controlling the aroma diffuser 30. Thus, in a case where the control of the individual pieces of environmental equipment is changed, complex examination of influences on different indexes is not performed, but simple examination of an influence on the degree of arousal as a uniform index can be performed.

In addition, in the control of the individual pieces of environmental equipment, an index differently perceived by each user, such as a temperature or an aroma concentration, is not used, but the degree of arousal as a uniform index is used, and thus it is possible to reduce a difference in perception among users. In particular, in the above embodiment, learning is performed by using learning data including not only the degree of arousal but also the amount of change in degree of arousal, and the learning is reflected as a coefficient of a mathematical model held by the NN processing unit 82. Thus, it is possible to reduce a difference in change in degree of arousal among individual users. Accordingly, the information held by the NN processing unit 82 that has performed learning a predetermined amount or more (information on a mathematical model including a coefficient) is highly versatile information, and a constant effect is likely to be obtained also in the case of using the information in an apparatus that is used for another user other than the environmental equipment control apparatus 100 according to this embodiment.

(4-4)

In the environmental equipment control apparatus 100 according to this embodiment, an arbitrary one of a plurality of types of control plans for the individual pieces of environmental equipment is selected and executed. In particular, in this embodiment, only a control plan specialized for a specific piece of environmental equipment is not continuously selected and executed, but an arbitrary control plan is selected and executed in rotation.

Thus, a change in environment given to the user through execution of a control plan is not limited to only a specific type of change in environment, such as a change in temperature, but various changes in environment, such as a change in carbon dioxide concentration, a change in aroma concentration, or a combination of these changes, can be provided.

Accordingly, it is possible to suppress blunting of change in degree of arousal with respect to the same type of change in environment, which occurs when the user continuously receives the same type of change in environment (for example, the user becomes accustomed to a change in temperature when a change in temperature is continuously executed as a change in environment).

Accordingly, it is possible to continuously and sufficiently ensure a change in the degree of arousal of the user in a case where the environmental equipment control apparatus 100 executes a control plan, and it is also possible to sufficiently improve the degree of arousal of the user.

(4-5)

In the environmental equipment control apparatus 100 according to this embodiment, a target degree of arousal is grasped by using information about the degree of complexity of work to be performed by the user received by the remote controller 50.

Here, in a case where the degree of complexity of the work is higher than or equal to a standard degree of complexity, not an unnecessarily high target degree of arousal, but a predetermined specific degree of arousal is set as a target degree of arousal.

Thus, in a case where the degree of complexity of the work is higher than or equal to the standard degree of complexity and the current degree of arousal of the user is in an excessive arousal state over the predetermined specific target degree of arousal, a control plan for actively decreasing the degree of arousal of the user (for actively relaxing the user) is selected and executed by the environmental equipment control apparatus 100.

In this way, the environmental equipment control apparatus 100 is capable of providing an environment for achieving the degree of arousal that makes working efficiency favorable in accordance with the degree of complexity of work performed by the user.

(5) Modification Examples

In the above embodiment, an example of an embodiment of the present invention has been described. The above embodiment is not intended to limit the present invention, and the present invention is not limited to the above embodiment. The present invention obviously includes an embodiment appropriately changed without deviating from the gist of the present invention.

The above embodiment and a plurality of modification examples described below may be appropriately combined such that a mutual inconsistency does not arise.

(5-1) Modification Example A

In the above embodiment, a description has been given of a case as an example where the selecting and executing unit 92 selects and executes one of a plurality of types of control plans output by the initial processing unit 81 or the NN processing unit 82 in accordance with simple rotation.

However, for example, the selecting and executing unit 92 may randomly (not in particular order) select a control plan not closely related to a control plan that has previously been selected and executed, instead of selecting one of a plurality of types of control plans in accordance with simple rotation. A determination of whether or not the relation is shallow is not limited, and may be made in accordance with a predetermined criterion of determination. For example, in a case where the aroma diffuser 30 is not used (in an OFF state) in the preceding control plan, a control plan of using the aroma diffuser 30 (in an ON state) may be preferentially selected as the next control plan.

In this way, as a result of selecting and executing a control plan having a shallow relation, data with largely different properties can be collected as learning data. Thus, learning efficiency can be increased, and a mathematical model reflecting a trend of the degree of arousal of the user can be constructed more promptly.

(5-2) Modification Example B

In the above embodiment, a description has been given of a case as an example where the degree of arousal, which is an example of the physical and mental state of the user, is estimated on the basis of information detected by the electrocardiographic waveform sensor 41 as the biological sensor 40.

Regarding this, the physical and mental stage of the user is not limited thereto. For example, various types of information, such as the degree of sleepiness of the user, the degree of tension of the user, the degree of sweating of the user, and the autonomic nerve balance of the user, may be used. The measurement or estimation of the degree of sleepiness of the user, the degree of tension of the user, the degree of sweating of the user, and the autonomic nerve balance of the user may be performed by using a known technique.

In the case of managing and evaluating an autonomic nerve balance as the physical and mental state of the user, a sympathetic nerve activity index (LF/HF) calculated on the basis of a heart rate pattern or a pulse rate pattern can be used. The sympathetic nerve activity index (LF/HF) can be grasped by using a known measuring device for the user. In the case of using the sympathetic nerve activity index (LF/HF) as the physical and mental state of the user, a highly reliable value can be grasped as the state of the sympathetic nerve of the user, and the index can be immediately grasped by using the known measuring device. Thus, environmental equipment can be controlled in real time in accordance with the sympathetic nerve activity index (LF/HF) of the user.

These indexes can be used as an index indicating the physical and mental state of the user not only in the example described in the above embodiment but also in an example described in each modification example or the like.

(5-3) Modification Example C

In the above embodiment, a description has been given by using the air conditioning apparatus 10, the ventilating apparatus 20, and the aroma diffuser 30 as an example of environmental equipment.

However, the environmental equipment is not limited to these apparatuses. For example, a lighting apparatus may be used to adjust the illuminance in a room and change the degree of arousal of the user, or a sound system (including a speaker or the like) capable of providing a plurality of types of music with different rhythms may be used to change the degree of arousal of the user. In the case of using a lighting apparatus, control may be performed to increase an illuminance to increase the degree of arousal of the user or to decrease an illuminance to decrease the degree of arousal of the user. In the case of using a sound system, control may be performed to play high-tempo music to increase the degree of arousal of the user or to play low-tempo music to decrease the degree of arousal of the user.

In the above embodiment, a description has been given of a case as an example where the ventilating apparatus 20 and the aroma diffuser 30 are simply ON/OFF controlled. As the ventilating apparatus 20, an apparatus capable of controlling a ventilation air volume may be used to adjust the degree of arousal of the user in accordance with the ventilation air volume. As the aroma diffuser 30, an apparatus capable of controlling a spray quantity of aromatic substance may be used to adjust the degree of arousal of the user in accordance with the spray quantity. The aroma diffuser 30 may be configured to contain an aroma for increasing the degree of arousal of the user and an aroma for decreasing the degree of arousal of the user and to emit at least either of them in accordance with a control plan. Although not limited, an aroma of lemon may be used as the aroma for increasing the degree of arousal of the user, and cedrol may be used as the aroma for decreasing the degree of arousal of the user.

In addition, the air conditioning apparatus 10 may be capable of controlling a humidity in a room and may adjust the degree of arousal of the user by controlling the humidity.

(5-4) Modification Example D

In the above embodiment, a description has been given of a case as an example where the exclusion processing unit 91 founds a control plan satisfying a predetermined exclusion condition as a control plan unsuitable for the user from among a plurality of types of control plans output by the initial processing unit 81 or the NN processing unit 82 and excludes the control plan.

Regarding this, for example, an upper limit may be set to the width of change in details of control of individual pieces of environmental equipment included in a control plan from a current state so as to prevent a large environmental change that can be perceived by the user from being selected and executed, and an exclusion condition may be determined to exclude a control plan including the control of environmental equipment that causes a change exceeding the upper limit.

Accordingly, it is possible to execute a control plan as needed without causing the user to perceive an environmental change, and thus it is possible to improve the degree of arousal while suppressing a decrease in concentration of the user caused by the perception of an environmental change.

In addition, the configuration of the initial processing unit 81 or the NN processing unit 82 in the above embodiment may be changed to prevent output of a control plan in which the width of change in details of control of individual pieces of environmental equipment from a current state exceeds the predetermined upper limit.

Here, the upper limit of the width of change in details of control of individual pieces of environmental equipment from a current state for not causing the user to perceive an environmental change is not limited. The user may gradually increase the level of change in environment per unit time by operating each piece of environmental equipment to grasp the width of change in environment perceived by the user in advance, and may input the grasped width of change in environment of each piece of environmental equipment to the environmental equipment control apparatus 100. Regarding an environmental change item in which a difference between individuals is less likely to occur, a predetermined width of change in environment of each piece of environmental equipment may be input to the environmental equipment control apparatus 100.

For example, in a case where the user does not perceive an environmental change when the set temperature of the air conditioning apparatus 10 is increased by 1° C. and the user perceives an environmental change when the set temperature is increased by 2° C., the environmental equipment control apparatus 100 is configured such that a control plan for changing the set temperature by 2° C. or more at one time is not executed.

In this way, even in a case where an upper limit is provided to the width of change per unit time in each environmental factor, such as a temperature, a carbon dioxide concentration, and an aroma concentration, to prevent the user from perceiving an environmental change, a control plan for simultaneously changing a plurality of types of environmental factors can be executed according to the above embodiment, and thus it is possible to sufficiently improve the degree of arousal of the user while changing each environmental factor within the corresponding upper limit.

(5-5) Modification Example E

In the above embodiment, notification using information display, audio output, or the like by the environmental equipment control apparatus 100 is not particularly mentioned. However, a configuration including a display unit, such as a liquid crystal display, and a speaker or the like may be used to enable the notification.

(5-6) Modification Example F

In the above embodiment, a description has been given of a case as an example where a neural network is used as a learning algorithm for learning a control plan for achieving a target amount of change in degree of arousal.

Regarding this, the learning algorithm is not limited to a neural network. For example, a known learning algorithm, such as deep learning, support vector machine, or Bayesian estimation, may be used.

(5-7) Modification Example G

In the above embodiment, a description has been given of a case as an example where a control plan satisfying the exclusion condition stored in the exclusion condition data unit 74 is excluded before selecting one control plan from among a plurality of types of control plans that are output.

Here, examples of a control plan satisfying the exclusion condition stored in the exclusion condition data unit 74 include a control plan of a set temperature that causes a user to feel excessively uncomfortable (for example, a set temperature of 20° C. or less or 28° C. or more) and a control plan in which the width of change in set temperature from a current state is too large (for example, the width of change in set temperature from a current state is ±5° C. or more). Here, a method for determining such an exclusion condition is not limited. For example, an exclusion condition may be determined so as to exclude a control plan that damages environmental equipment, for example, that causes condensation at a specific portion (a portion other than an evaporator or the like) of the air conditioning apparatus 10, or so as to exclude a control plan of low energy efficiency in which the energy consumed by environmental equipment such as the air conditioning apparatus 10 is a predetermined value or more and excessive. The exclusion condition need not constantly be the same, but different conditions may be applied in accordance with a situation. For example, an exclusion condition for a season when an outside temperature is higher than a predetermined value (for example, summer) (for example, a condition for excluding a control plan in which the set temperature is 24° C. or less) may be set to be different from an exclusion condition for a season when an outside temperature is lower than a predetermined value (for example, winter) (for example, a condition for excluding a control plan in which the set temperature is 24° C. or more).

In addition, the environmental equipment control apparatus 100 may be configured to allow the user to input a setting in accordance with his/her preferences by using the remote controller 50 or the like, so that an exclusion condition that has been input and set is stored in the exclusion condition data unit 74. For example, some of the types of aroma diffused by the aroma diffuser 30 are difficult for the user to accept. Thus, the user may perform input to exclude a control plan that uses a type of aroma hated by the user, so that the control plan that uses the specific aroma satisfies the exclusion condition. In a case where the environmental equipment control apparatus 100 receives, from the user through the remote controller 50 or the like, an instruction indicating that the user does not like a control plan that is currently being executed (for example, an instruction to stop or change the control plan that is currently being executed) while the environment in which the user is present is being changed by the execution of the control plan by the selecting and executing unit 92 (for example, within a predetermined period of time from the start of the control plan), the exclusion condition data unit 74 may be overwritten under the assumption that the control plan that is currently being executed satisfies the exclusion condition. Means for reflecting the user's preferences in the above-described manner is not limited to input using the remote controller 50, and a user terminal such as a smartphone or a wireless switch may be used.

(6) Others (6-1) Others A

In the above embodiment, a description has been given of a case as an example where the degree of arousal is used as an index indicating the physical and mental state of the user, and the degree of arousal is estimated by using information obtained from the user through the biological sensor 40 to control environmental equipment to achieve a target degree of arousal.

Regarding this, in a case where the productivity of the user can be objectively indicated, a numerical value indicating the productivity of the user may be used as an index for controlling environmental equipment, instead of using an index indicating the physical and mental state of the user, such as the degree of arousal.

Here, the numerical value indicating the productivity of the user is not limited. For example, the amount of information that is input per unit time by the user who performs an information input task, the score of a test of the user who is a cram school student, the amount of program (the number of rows of a program or the like) created per unit time by the user who is a programmer, or the number of people treated per unit time by the user who is an operator of a call center may be used.

Also in the case of using such a numerical value indicating the productivity as an index, a similar effect can be obtained by using a numerical value indicating the productivity instead of the degree of arousal in the above embodiment. That is, an effect similar to that of the above embodiment can be obtained by selecting and executing a control plan for environmental equipment for achieving a difference between a current productivity and a target productivity and by performing learning.

(6-2) Others B

Generally, it is known that there is a concept of a neutral temperature, which is a temperature at which a human feels comfortable, not too hot or not too cold, and that the neutral temperature is influenced by transition of a most recent past outside temperature. That is, in a case where a human has most recently been in an environment where an outside temperature is high, the body of the human has adapted to and become accustomed to the high temperature. In a case where a human has most recently been in an environment where an outside temperature is low, the body of the human has adapted to and become accustomed to the low temperature. Thus, for example, an influence of a certain environmental change on a user who has been accustomed to a high temperature may be different from an influence of the same certain environmental change on a user who has not been accustomed to such a high temperature, and also an influence on the physical and mental state, such as the degree of arousal, or productivity or the like of the user may vary.

It is desired that the environmental equipment control apparatus be capable of controlling a plurality of pieces of environmental equipment so that the physical and mental state, such as the degree of arousal, or productivity or the like of the user approaches a target state on the basis of past history information.

Regarding this, in the environmental equipment control apparatus that controls the environment of a space where a user is present by using environmental equipment, most recent past environmental information, which is environmental information in a predetermined preceding period in the most recent past, is obtained, and details of control of the environmental equipment is changed in accordance with the most recent past environmental information, and accordingly it is possible to cause the physical and mental state, such as the degree of arousal, or productivity or the like of the user to approach a target state. Specifically, the grasping unit grasps a current value related to the physical and mental state, such as the degree of arousal, or productivity or the like of the user, a target value thereof, and most recent past environmental information. At the time of specifying details of control of the environmental equipment enabling the current value related to the physical and mental state, such as the degree of arousal, or productivity or the like of the user to approach the target value, the details of control are specified on the basis of the most recent past environmental information. More specifically, for example, in a case where an air conditioning apparatus is used as environmental equipment and a temperature in a space where the user is present for a predetermined period in the most recent past is grasped as most recent past environmental information, a set temperature may be specified in view of a trend in which, in a case where the temperature has continuously been high in the most recent past (higher than a predetermined temperature), the degree of arousal of the user is increased more significantly by decreasing the set temperature of the air conditioning apparatus than in a case where the temperature has continuously been low in the most recent past (lower than a predetermined temperature).

In addition, such a relationship between the degree of arousal or the like and a neutral temperature can be applied to a relationship between the degree of arousal or the like and a neutral carbon dioxide concentration. In addition, such a relationship can be applied to a relationship between the degree of arousal or the like and a neutral illuminance in a case where a lighting apparatus is used as environmental equipment. In this case, the degree of arousal or the like of the user can be controlled more accurately by considering an influence of a history of illuminance in the last few minutes on human perception of brightness or darkness. Thus, the environmental equipment is not limited to an air conditioning apparatus, and a lighting apparatus, an aroma diffuser, a ventilating apparatus, a sound system, and a combination thereof may be used. Here, the lighting apparatus may use a most recent past brightness (illuminance or the like) around the user as environmental information, the aroma diffuser may use a most recent past type or concentration of aroma around the user as environmental information, the ventilating apparatus may use a most recent past carbon dioxide concentration around the user as environment information, and the sound system may use a most recent past volume of sound around the user as environmental information. The length of the predetermined preceding period in the most recent past may be specified so as to vary according to the type of environmental equipment. Specifically, the length of the predetermined preceding period in the most recent past may be about one week in the relationship with the set temperature of an air conditioning apparatus, and the length of the predetermined preceding period in the most recent past may be about a few minutes in the relationship with the illuminance of a lighting apparatus.

In the above embodiment, a description has been given of a case as an example where a plurality of types of initial control plan data as a combination of control plans of individual pieces of environmental equipment are predetermined in accordance with the value of a target amount of change in degree of arousal ($\Delta A$) in the initial control plan data unit 72. By applying the above-described concept of a neutral temperature to this case, for example, in the case of outputting a plurality of control plans or excluding a control plan in the control of a room temperature by the air conditioning apparatus 10 described in the above embodiment, a history of outside temperature in a predetermined period in the past (for example, the last one week) having an influence on the hotness or coldness perceived by the user may be reflected. Accordingly, the degree of arousal or the like of the user can be controlled more accurately in view of an influence of a history of a recent outside temperature on a human perception of hotness or coldness. Here, outside temperatures in individual regions or seasons may be stored or a neutral temperature may be directly stored to learn an influence on the degree of arousal or the like of the user.

REFERENCE SIGNS LIST 1 environmental equipment control system
10 air conditioning apparatus (environmental equipment, apparatus that adjusts a temperature, apparatus that adjusts a humidity)
20 ventilating apparatus (environmental equipment, apparatus that adjusts a carbon dioxide concentration)
30 aroma diffuser (environmental equipment, apparatus that provides aroma)
40 biological sensor
41 electrocardiographic waveform sensor
50 remote controller
60 grasping unit
61 temperature grasping unit (grasping unit)
62 carbon dioxide concentration grasping unit (grasping unit)
63 aroma concentration grasping unit (grasping unit)
64 current degree of arousal grasping unit (grasping unit)
65 target degree of arousal grasping unit (grasping unit)
66 target amount of change in degree of arousal grasping unit (grasping unit)
70 storage unit
71 degree of arousal comparison data unit
72 initial control plan data unit
73 mathematical model coefficient data unit
74 exclusion condition data unit
75 learning data accumulation unit
80 learning control plan output means
81 initial processing unit (learning control plan output means)
82 NN processing unit (learning control plan output means)
90 selection control unit
91 exclusion processing unit (selection control unit)
92 selecting and executing unit
100 environmental equipment control apparatus

CITATION LIST

Patent Literature

PTL 1: Japanese Unexamined Patent Application Publication No. 2011-101746

The invention claimed is:
1. An environmental equipment control apparatus for controlling a plurality of types of environmental equipment, comprising:
an electronic controller including
a grasping unit that grasps current physical and mental state information about a current physical and mental state of a user, environmental situation information, and target relationship information representing a relationship between a target physical and mental state and the current physical and mental state;
learning control plan output means that outputs a control change plan for each of combinations of the plurality of types of environmental equipment in accordance with the current physical and mental state information, the environmental situation information, and the target relationship information; and
a selection control unit that selects, based on a predetermined condition, one control change plan from among a plurality of the control change plans output by the learning control plan output means after excluding a control change plan satisfying a predetermined exclusion condition, and executes the one control change plan,
wherein the learning control plan output means learns to update a method for specifying the control change plan to be output, by using a physical and mental state of the user changed by executing the control change plan selected by the selection control unit.
2. The environmental equipment control apparatus according to claim 1, wherein
the physical and mental state of the user is a degree of arousal of the user.
3. The environmental equipment control apparatus according to claim 1, wherein
the learning control plan output means is computing means using a neural network.
4. The environmental equipment control apparatus according to claim 1, wherein
the selection control unit selects the one control change plan from among the plurality of control change plans output by the learning control plan output means while rotating combination patterns of the plurality of types of environmental equipment.
5. The environmental equipment control apparatus according to claim 1, wherein
the plurality of types of environmental equipment include at least any two or more of an apparatus that adjusts a temperature, an apparatus that adjusts a humidity, an apparatus that adjusts a carbon dioxide concentration, an apparatus that provides aroma an apparatus that adjusts illumination, and an apparatus that adjusts acoustics.
6. The environmental equipment control apparatus according to claim 1, wherein
the learning control plan output means has and is capable of outputting an initial control change plan, before the learning is performed, for each of the combinations of the plurality of types of environmental equipment corresponding to initial current physical and mental state information, initial environmental situation information, and initial target relationship information.

* * * * *